Feb. 22, 1944.  G. A. TINNERMAN  2,342,312
FASTENING DEVICE
Filed July 3, 1941
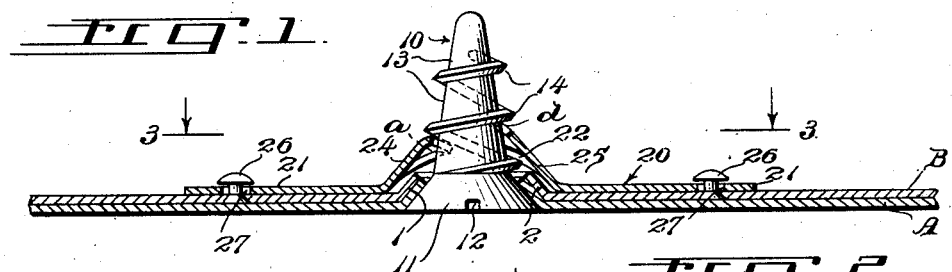
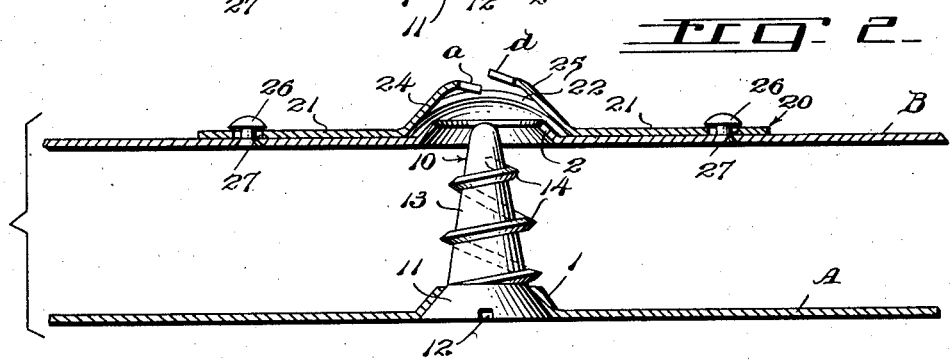
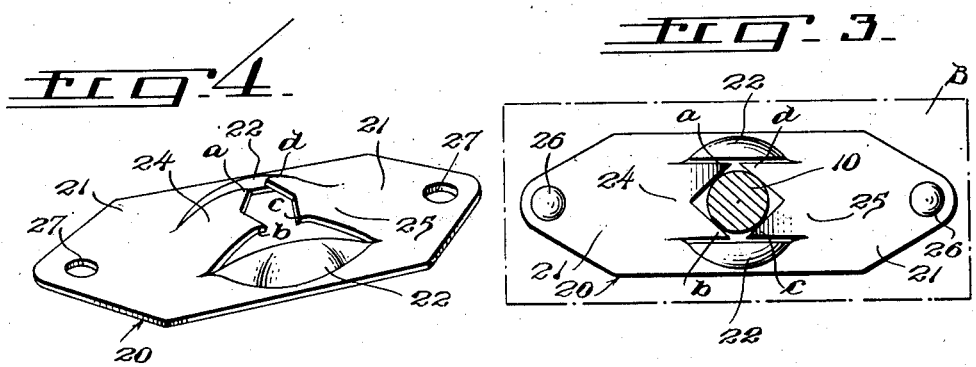
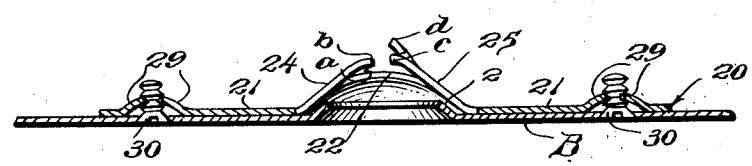
Inventor
GEORGE A. TINNERMAN
By H. I. Lombard
Attorney Patented Feb. 22, 1944

2,342,312

UNITED STATES PATENT OFFICE 2,342,312

FASTENING DEVICE

George A. Tinnerman, Cleveland, Ohio, assignor to Tinnerman Products, Inc., Cleveland, Ohio, a corporation of Ohio Application July 3, 1941, Serial No. 401,015

2 Claims. (Cl. 85—32)

This invention relates in general to fastening devices of the character embodying cooperating spring locking plate and stud fastening members designed for easily and quickly securing the parts of an assembly under a combined spring pressure and self-locking action which prevents accidental loosening or release of the fastening members under severe conditions of vibration, shock and the like.

More particularly, the invention is directed to an improved form of a fastening device comprising a sheet metal locking plate member having a spring nut fastening relation with a cooperating bolt or screw fastening in a manner to permit the parts of an assembly to be easily and quickly secured in a positive, self-locking action and yet capable of being readily released without mutilating or distorting the fastening members such that the parts of the assembly may be disassociated and resecured thereby as often as may be necessary or desirable.

The fastening device of the present invention, while one of general utility in that it may be readily designed for use in a wide range and variety of installations, is particularly useful and advantageous in assemblies wherein a self-locking connection is required for releasably and resiliently clamping together two or more superposed or juxtaposed parts under continuously effective spring pressure in a manner to eliminate or absorb the effects of any vibratory motion, and the like, which might possibly cause a loosening of the fastening device from applied fastening position.

In such installations, the present invention has particular application for detachably locking in place panel-like members such as cover plates, closure panels and similar parts which cover or conceal the service openings in the body of an aeroplane or motor vehicle, as, for example, in a cowling assembly or the mounting of a radiator casing, hood, or the like.

A primary object of the present invention contemplates a fastening device of this character which has a positive, self-locking action and which is of relatively simple, inexpensive construction and the respective fastening members thereof capable of very economical quantity production to the extent that the cost thereof is considerably less than heretofore known forms of devices having a similar application and use.

Another principal object of the invention is for the provision of such a fastening device comprising a sheet metal locking plate designed for use with a cooperating bolt or screw fastening to provide a strong, durable, self-locking and clamped connection of the parts secured under continuously effective spring force which not only withstands loosening or displacement of such parts, but also prevents any possible accidental release of the members of the fastening device under extreme conditions of vibration, jarring effects, and the like.

A further object of the invention is to provide a fastening device of this character embodying a pair of cooperating fastening members having a screw threaded connection of relatively high pitch and thereby adapted to be fastened with comparatively greater speed and facility in securing the parts of an assembly under continuously effective spring force, and in a self-locking action, while otherwise capable of easy and quick separation or release to permit such secured parts to be disassociated and resecured as frequently as necessary without detracting from the efficiency of the fastening device.

Still another object of the invention is to provide such a fastening device wherein a positive, self-locking action is produced by the use of a stud fastening member having a tapered shank providing for progressively increasing spring force in the fastening action upon relative rotation of said spring locking plate and stud fastening members to fully tightened fastening position.

Present day streamlining of vehicles makes it desirable and necessary to provide the various fastening installations in such a manner that the streamlined exterior of the vehicle body will be unobstructed by any projecting portion of the stud member of the fastening device. A further, more specific object of the invention, therefore, is to provide a fastening device for such an installation in which the stud member is receivable in an apertured countersunk portion in the parts secured in substantially flush relation with the exterior thereof and in fastening relation with a cooperating locking plate having a hub or boss seating the same in operative relation to said countersunk portion together with means for threadedly engaging the stud member under progressively increasing spring locking force as said stud member is drawn taut.

Further objects and advantages, and other new and useful features in the construction, arrangement and general combination of parts of the invention will be readily apparent to those skilled in the art as a description thereof proceeds with reference to the accompanying drawing, for purposes of illustration but not of limitation, in which like reference characters designate like parts throughout the same, and in which:

Fig. 1 is a sectional view of an installation in which superposed parts are secured by the improved spring locking plate and bolt fastening members of the invention;

Fig. 2 is a similar sectional view showing the fastening members of Fig. 1 in position for securing or releasing the parts of the installation;

Fig. 3 is a sectional view of Fig. 1 taken on line 3—3, looking in the direction of the arrows;

Fig. 4 is a perspective view showing the general construction of the spring locking plate illustrated in Figs. 1-3 inclusive; and, Fig. 5 is a sectional view showing the bolt or screw engaging means of the spring locking plate in edge elevation and illustrating an alternate arrangement for attaching the locking plate to its supporting part.

Generally speaking, the present invention is directed to an improved form of self-locking and separable fastening device comprising a spring locking plate member especially designed for use with a bolt or screw fastening member having a thread of relatively high pitch in a manner to effect a relatively quick fastening engagement or release of said fastening members in a minimum of time and effort. The spring locking plate is provided with thread engaging means for threadedly engaging the bolt or screw in this manner under a pronounced axial spring force as the same is advanced to tightened fastening position, while the bolt or screw is preferably of a type having a tapered shank designed to exert, in addition, a progressively increasing amount of lateral spring force in such thread engaging means in providing a positive locked securing relation of said fastening members in tightened fastening position.

Referring now, more particularly, to the drawing, the fastening device is shown embodying a pair of cooperating fastening members comprising a rotatable bolt or screw 10 and a spring locking plate 20 adapted for cooperative fastening engagement in securing two or more complementarily fitted parts A, B, in an installation. Such parts may be of any suitable material with the secured portions thereof usually assuming the form of complementary plates of which part B may be termed the supporting plate comprising, for example, the body of an aeroplane adjacent a service opening therein, with part A being a portion of the cover plate secured thereto to cover such service opening but capable of being easily and quickly released and removed, if desired, to permit access to such service opening for any desired purpose. Of course, in some installations the members 10, 20, of the fastening device may be in reversed position, if desired, depending upon which side of the secured parts is more readily accessible and the rotatable member of the fastening device most conveniently manipulated. In this respect, if the stud is fixedly secured to its associated part A, the spring locking plate 20 may be employed as the member which is rotated to provide the necessary relative rotation of the said members 10, 20, for effecting the self-locking, threaded engagement thereof in applied fastening position, in the manner presently to be described.

The invention is disclosed in connection with a preferred form of installation in which the parts A, B, to be secured are in the form of metallic plate-like members having countersunk portions 1, 2, respectively, provided with openings receiving the shank of the bolt or screw fastening 10. Such countersunk portions are provided in the plates A, B, in complementarily spaced relation as necessary to receive the required number of bolt fastenings 10 employed with a similar number of locking plates 20 on part B. The countersunk portions 1 on part A are slightly smaller than the complementary countersunk portions 2 on part B in order to nest snugly therein and permit the parts A, B to be brought into close, uniform contact in superposed relation, as shown in Fig. 1. Such nested countersunk portions thus serve as registering means for easily and quickly aligning said parts A, B, in proper assembled relation while also allowing for limited adjustment of said parts in such assembled relation depending on the amount of clearance provided for between said countersunk portions in nested relation.

The stud fastening member 10 is rotatably disposed with respect to the cover plate or other part A by extending through the aperture in the countersunk portion 1 thereon to project from the rearward face of said part. The stud is provided with a head 11 which is snugly received in said countersink 1 in substantially flush relation with the outer surface of said part A in such a manner that the streamlined contour of the exterior of the aeroplane body or other part will be smooth, even and uniform throughout. In the present example, the bolt or screw head 11 is shown provided with a simple form of tool recess 12 in which a screw driver may be engaged but it is quite obvious that other equivalent means may be employed for engagement by a wrench, pliers or other suitable tool. The shank of the bolt or srew is preferably of the type having a tapered, generally conical root diameter 13 in the manner of a sheet metal or wood screw and provided with a helical thread 14 of relatively high pitch.

The spring locking plate 20 is designed to cooperate with the stud 10 in the manner of a nut bearing on part B, which is usually at the rearward side of the installation. Said locking plate is a relatively cheap article of manufacture in that it may be produced by simple stamping and forming operations from a comparatively small, inexpensive section of any suitable sheet metal, preferably of a spring metal nature, such as spring steel or cold rolled metal having springlike characteristics. The general construction of the locking plate is shown in Fig. 4 and, of course, may be formed readily from sheet metal sections of various outlines, but from the standpoint of economical quantity production, is most advantageously provided from a generally rectangular blank obtained from ordinary sheet metal strip stock with a minimum loss or waste of material.

A preferred construction of the locking plate 20 embodies base flanges 21 on opposite sides of a substantially ball-shaped hub or boss 22 defined by a generally concavo-convex protuberance integrally formed from the body of the blank to project from the upper surface thereof. Said hub or boss 22 is provided of a size sufficient for the inner walls thereof to receive the nested countersunk portions 1, 2 in a manner whereby the base flanges 21 thereof may bear firmly and rigidly on the adjacent surfaces of part B. If desired, said hub or boss 22, may be made sufficiently large to provide a suitable clearance between the inner walls thereof and said nested countersunk portions 1, 2, in order to permit limited shifting of the locking plate for adjustment purposes in attached relation on said part B.

In the approximate center of said boss 22 a bolt opening is punched together with spaced parallel slits on either side thereof defining cooperating tongues 24, 25, integral with the base flanges 21 and having their extremities shaped to lie on a helix corresponding substantially to the helix of the thread 14 on the bolt or screw 10. Said tongues 24, 25, are formed for the most part from the boss 22, and since said boss projects out of the plane of the blank body, said tongues are capable of being provided with an increased effective length in the manner of relatively long curved spring elements extending outwardly out of the general contour of the hub or boss 22 from which they are struck and formed.

Said tongues 24, 25 otherwise are disposed in inclined relation to each other and suitably curved longitudinally as necessary to dispose the extremities thereof on the desired thread helix, as aforesaid. In this respect the extremities of said tongues 24, 25, are preferably V-notched, curved or otherwise recessed to define a series of thread engaging elements or prongs $a$, $b$, $c$, and $d$, respectively, which are bent and shaped as necessary to conform to the relatively high pitch of the thread helix as illustrated in Figs. 1 and 5.

The spring locking plate 20 thus provided is designed to bear upon the outer face of part B which, for purposes of illustration, may be referred to as the rearward side of the installation and, in a blind location, often is not conveniently or readily accessible for holding the locking plate as the cooperating stud 10 is inserted and fastened therewith. In such instances, the locking plate preferably is permanently attached to said part B in any suitable manner, as by rivets, eyelets or the like, 26, extending through openings 27 provided in the base flanges 21 of the spring locking plate as shown in Fig. 1. The spring locking plate, of course, may be employed in the manner of a rotatable nut device or otherwise, fixedly attached to the supporting part B by spot welding, or by attaching bolts or screws 30, Fig. 5, threadedly engaged with ordinary threaded nuts or applied to integral thread engaging elements 29 struck and formed from the base flanges 21 of the locking plate and defining thread openings designed for threadedly engaging said attaching bolts or screws 30.

The hub or boss 22 of the locking plate is disposed in overlying, more or less concentric relation to the countersink 2 on part B while the opening between the extremities of the tongues 24, 25, is substantially aligned with the stud passage in said countersink 2 and capable of limited adjustment relative thereto by virtue of the enlarged openings 27 in the base flanges 21 permitting shifting of the locking plate with respect to the attaching rivets 26.

The opening between the tongue extremities is preferably only slightly larger than necessary to admit the pilot portion of the screw 10, and accordingly, upon initial turning of said screw, the leading end of the thread 14 thereof readily engages and rides over the lowermost prong $a$ of the tongue 24. Upon further turning of the screw, the thread 14 successively engages the prongs $b$, $c$ and $d$ disposed at progressively increasing heights conforming to the inclination or helix of the thread 14 and forces the same into even, uniform, threaded engagement therewith.

Due to the relatively high pitch of the screw thread 14, the bolt or screw 10 may be quickly turned to tightened fastening position in which the resilient tongues 24, 25, thus disposed in uniform threaded engagement with said screw thread, are tensioned downwardly and thereby exert a pronounced axial spring force on the shank of the bolt or screw. This axial spring force takes place through the bending moment set up in the tongues 24, 25, in the tightened position of the bolt or screw which is produced by the downward pressure of the convolution of thread 14 finally engaged with the tongue extremities, and the upward reaction pressure of said tongues in attempting to assume their initial, untensioned condition.

At the same time, since the bolt 10 preferably is of the type having a tapered, generally conical root diameter 13, the tongue extremities are gradually spread apart with progressively increasing force until in the fully tightened position of the bolt or screw, said tongue extremities exert, in addition, a pronounced binding spring force laterally of the shank of the bolt or screw. A combined axial and lateral spring force thus is exerted by the tongues on the bolt or screw shank which not only provides a firm, rigid, clamped connection of the parts secured under continuously effective spring force, but also ensures a positive locked relation of the fastening members which eliminates possibility of accidental loosening or unintended disengagement thereof from applied fastening position, and yet permits an easy quick release of said fastening members and separation of the parts secured in a minimum of time and effort in the manner intended.

It will be understood, of course, that the flexion or depression taking place in the tongues 24, 25, either in securing or releasing the cooperating members of the fastening device results in no permanent distortion or deformation of said tongues, so that upon release of the fastening members from locked relation, as aforesaid, the various elements of the spring locking plate automatically assume their initial untensioned form ready for securing or coupling engagement with the bolt or screw member 10 in a repetition of the previously described procedure.

One of the most important advantages of the present invention resides in the improved construction of the locking plate embodying the hub or boss 22 provided as a substantially rigid protuberance deformed from the body of the blank in a manner to provide for an increased effective length of the tongues 24, 25, and added strength in the body of the locking plate while otherwise rigidly connecting the base flanges 21 in order that the same may so support the tongues 24, 25, as to withstand any reasonable requirement in the tightening and locking of the bolt or screw 10 in fastened relation therewith.

A further important advantage is obtained in the use of a bolt or screw provided with a tapered root 13 designed for a progressively increasing binding and wedging action with the extremities of the tongues 24, 25, as said bolt or screw is drawn up into tightened fastening position. In this respect, it is preferable to have the tongue extremities so arranged in initial position, Figs. 2 and 5, that as the bolt or screw is applied thereto, said tapered root 13 thereof not only causes a gradual spreading of said tongues in locking, binding engagement therewith, as aforesaid, but also forces the tongue extremities generally outwardly and upwardly as necessary to abut the adjacent undersurfaces of the relatively high pitched thread 14 in even, uniform threaded engagement therewith in tightened fastening position, substantially as illustrated in Fig. 1.

A cheap but effective locking plate may be provided from cold rolled metal, such as cold rolled steel, which is untempered but of a spring metal nature and preferably harder than that of the cooperating bolt or screw employed therewith in providing an effective and reliable fastening means adapted for a long period of satisfactory service and use.

While the invention has been described in detail with a specific example, such example is intended as an illustration only, since it will be apparent to those skilled in the art that other modifications in the construction, arrangement, and general combination of parts thereof may be devised without departing from the spirit and scope of the invention.

What is claimed is:

1. A fastening device comprising a plate, a pair of dome segments formed from the body of the plate and merging therewith at their outer edges and having their inner edges spaced apart and a pair of tongues formed from the material of the plate between the dome segments and bent outwardly beyond the segments and having their ends formed to engage a stud passing through the plate.

2. A fastener plate of sheet material formed with a dome adapted to house an inward flange on a plate to be attached by a countersinking bolt, said fastener plate having a pair of integral tongues partially severed from the dome and projecting outwardly beyond the remainder of the dome in oppositely inclined directions, the free end portions of the tongues being oppositely warped to form thread-engagers for the bolt.

GEORGE A. TINNERMAN.